United States Patent
Zhang et al.

(10) Patent No.: US 9,088,770 B2
(45) Date of Patent: Jul. 21, 2015

(54) SIZE BASED TRANSFORM UNIT CONTEXT DERIVATION

(75) Inventors: Wenhao Zhang, Beijing (CN); Yi-Jen Chiu, San Jose, CA (US); Pieter Kapsenberg, Chandler, AZ (US); Lidong Xu, Beijing (CN); Yu Han, Beijing (CN); Zhipin Apple Deng, Beijing (CN); Xiaoxia Cai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 13/605,387

(22) Filed: Sep. 6, 2012

(65) Prior Publication Data

US 2014/0050266 A1    Feb. 20, 2014

Related U.S. Application Data

(60) Provisional application No. 61/683,454, filed on Aug. 15, 2012.

(51) Int. Cl.
- H04N 7/12 (2006.01)
- H04N 19/122 (2014.01)
- H04N 19/96 (2014.01)
- H04N 19/91 (2014.01)

(52) U.S. Cl.
CPC ....... H04N 19/00084 (2013.01); H04N 19/122 (2014.11); H04N 19/91 (2014.11); H04N 19/96 (2014.11)

(58) Field of Classification Search
CPC .. H04N 19/00084; H04N 19/96; H04N 19/91
See application file for complete search history.

(56) References Cited

U.S. PATENT DOCUMENTS

| | | |
|---|---|---|
| 2011/0170012 A1 | 7/2011 | Cheon et al. |
| 2011/0243244 A1 | 10/2011 | Min et al. |
| 2011/0248873 A1* | 10/2011 | Karczewicz et al. ........... 341/67 |
| 2012/0163469 A1 | 6/2012 | Kim et al. |
| 2012/0177116 A1 | 7/2012 | Panusopone et al. |

OTHER PUBLICATIONS

International Search Report Received for PCT Patent Application PCT/US2013/047198, mailed on Oct. 7, 2013, 10 pages.
Thomas Wiegand, Joint Final Committee Draft (JFCD) of Joint Video Specification (ITU-T Rec. H.264 I ISO/IEC 14496-10 AVC), Joint Video Team (JVT) of ISO/IEC MPEG and ITU-T VCEG, 4th Meeting: Klagenfurt, Austria, Jul. 22-26, 2002, pp. 1-9.
International Preliminary Report on Patentability received for PCT Patent Application PCT/US2013/047198, mailed on Feb. 26, 2015, 7 pages.

* cited by examiner

*Primary Examiner* — Joseph Ustaris
*Assistant Examiner* — Zhubing Ren
(74) *Attorney, Agent, or Firm* — Glen Choi

(57) ABSTRACT

Systems, apparatus, articles, and methods are described including operations for size based transform unit context derivation.

41 Claims, 8 Drawing Sheets

SIZE BASED TRANSFORM UNIT CONTEXT DERIVATION

RELATED APPLICATIONS

The present application claims the benefit of U.S. Provisional Application No. 61/683,454 filed Aug. 15, 2012, and titled "SIZE BASED TRANSFORM UNIT CONTEXT DERIVATION".

BACKGROUND

A video encoder compresses video information so that more information can be sent over a given bandwidth. The compressed signal may then be transmitted to a receiver that decodes or decompresses the signal prior to display.

High Efficient Video Coding (HEVC) is a new video compression standard planned to be finalized by the end 2012. It is currently under development by the Joint Collaborative Team on Video Coding (JCT-VC) formed by ISO/IEC Moving Picture Experts Group (MPEG) and ITU-T Video Coding Experts Group (VCEG). Similar with previous video coding standards, HEVC consists of basic modules such as intra/inter prediction, transform, quantization and in-loop filtering and entropy coding.

HEVC defines Coding Units (CUs), which are used to sub-partition a picture into rectangular blocks with variable size. The Largest coding unit (LCU) can be a 64×64 block, a 32×32 block or a 16×16 block. A LCU can be encoded directly or be divided into 4 Coding Unit (CU) for next level encoding. For a CU in one level, it can be encoded directly or be further divided into next level for encoding. The smallest CU is 8×8. Within each LCU, a quadtree based splitting scheme may be used to specify the coding unit partition pattern.

In addition, Prediction Units (PUs) and Transform Units (TUs) are also defined by HEVC to specify how to divide a coding unit to do the prediction and transform, respectively. The PU segmentation depends on the coding unit coding mode. When intra coded, a coding unit with size equal to 2N×2N can be predicted in one 2N×2N PU or in four N×N PUs. When inter coded, a 2N×2N coding unit can be predicted in one 2N×2N PU, or two 2N×N PUs, or two N×2N PUs, or one 0.5N×2N PU and one 1.5N×2N PU, or one 1.5N×2N PU and one 0.5N×2N PU, or one 2N×0.5N PU and one 2N×1.5N PU, or one 2N×1.5N PU and one 2N×0.5N PU, or four N×N PUs.

The TU partition may also be quadtree splitting based. For example, a series of block transform cores may be define in HEVC, which can be 32×32 blocks, 16×16 blocks, 8×8 blocks, and/or 4×4 blocks. After the intra or inter prediction, the transform applies to the residual blocks to generate coefficients. After that, the coefficients may be quantized, scanned into one-dimensional order and finally Context-adaptive binary arithmetic coding (CABAC) coded.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
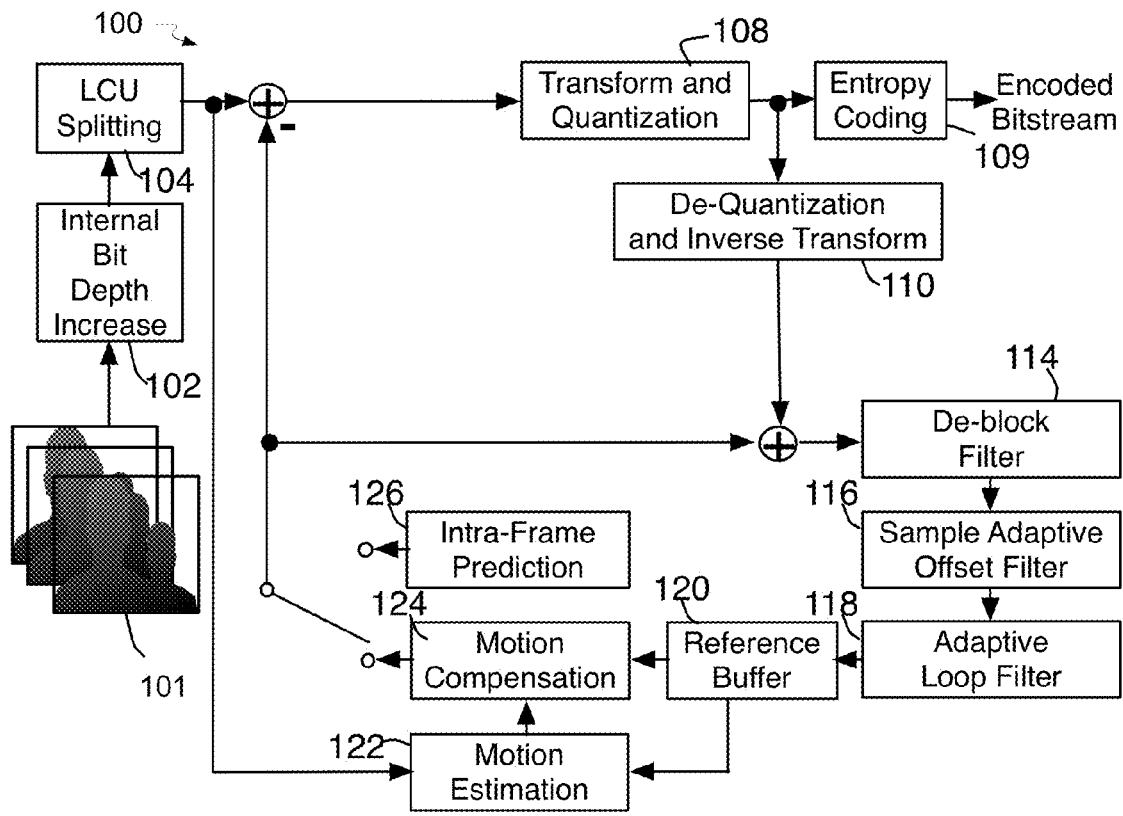
FIG. 1 is an illustrative diagram of an example video coding system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", "embodiment", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, aspect, element, or characteristic is described in connection with an implementation or embodiment, it is submitted that it is within the knowledge of one skilled in the art to effect such feature, structure, aspect, element, or characteristic in connection with other implementations or embodiments whether or not explicitly described herein. Any feature, structure, aspect, element, or characteristic from an embodiment can be combined with any feature, structure, aspect, element, or characteristic of any other embodiment.

Systems, apparatus, articles, and methods are described below including operations for size based transform unit context derivation.

As described above, in video coding systems, different transform sizes may be used to code prediction residuals. Inside a coding unit block, different transform cores with different sized may be arranged in a quadtree based structure, which can be signaled by quadtree depth and split flags in the bitstream. Entropy coding of transform split flags is typically performed via context based CABAC. In typical designs, the context index derivation scheme may use a total of four contexts for transform split flags and the context index may be derived by using depth values.

As will be described in greater detail below, operations for size based transform unit context derivation may be applied to the problem of video compression, and may be considered as a potential technology to be standardized in the international video codec committees. In some examples, a new context index derivation scheme may be used to code the transform split flag, which may be based on the transform unit size value, rather than the depth value. The number of possible contexts may be reduced from four contexts to three contexts, thereby reducing the complexity of entropy coding of transform split flags.

FIG. 1 is an illustrative diagram of an example video coding system 100, arranged in accordance with at least some implementations of the present disclosure. In various implementations, video coding system 100 may be configured to undertake video coding and/or implement video codecs according to one or more advanced video codec standards, such as, for example, the High Efficiency Video Coding (HEVC) H.265 video compression standard being developed by the Joint Collaborative Team on Video Coding (JCT-VC) formed by ISO/IEC Moving Picture Experts Group (MPEG) and ITU-T Video Coding Experts Group (VCEG). Further, in various embodiments, video coding system 100 may be implemented as part of an image processor, video processor, and/or media processor and may undertake inter prediction, intra prediction, predictive coding, and/or residual prediction.

As used herein, the term "coder" may refer to an encoder and/or a decoder. Similarly, as used herein, the term "coding" may refer to encoding via an encoder and/or decoding via a decoder. For example video encoder 103 and video decoder 105 may both be examples of coders capable of coding.

In some examples, video coding system 100 may include additional items that have not been shown in FIG. 1 for the sake of clarity. For example, video coding system 100 may include a processor, a radio frequency-type (RF) transceiver, a display, and/or an antenna. Further, video coding system 100 may include additional items such as a speaker, a microphone, an accelerometer, memory, a router, network interface logic, etc. that have not been shown in FIG. 1 for the sake of clarity.

During the operation of video coding system 100 on input video data 101, current video information may be provided to an internal bit depth increase module 102 in the form of a frame of video data. The current video frame may be split into Largest Coding Units (LCUs) at module 104 and then may be subjected to known video transform and quantization processes by a transform and quantization module 108. The output of transform and quantization module 108 may be provided to an entropy coding module 109 and to a de-quantization and inverse transform module 110. De-quantization and inverse transform module 110 may implement the inverse of the operations undertaken by transform and quantization module 108. Those skilled in the art may recognize that transform and quantization modules and de-quantization and inverse transform modules as described herein may employ scaling techniques. The output of de-quantization and inverse transform module 110 may be provided to a loop including a de-blocking filter 114, a sample adaptive offset filter 116, an adaptive loop filter 118, a buffer 120, a motion estimation module 122, a motion compensation module 124 and an intra-frame prediction module 126. As shown in FIG. 1, the output of either motion compensation module 124 or intra-frame prediction module 126 is both combined with the output of residual prediction module 106 as input to de-blocking filter 114, and is differenced with the output of LCU splitting module 104.

Figure 2:
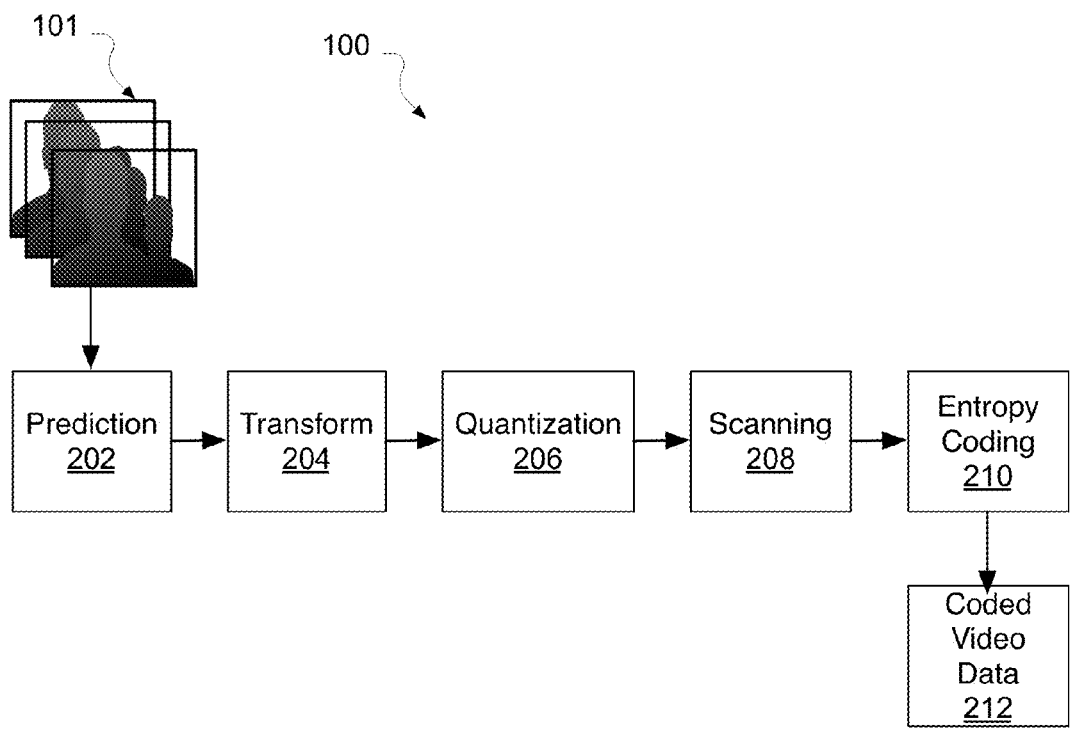
FIG. 2 is another illustrative diagram of an example video coding system.

FIG. 2 illustrates a high-level block diagram of an example video coding system 100 in accordance with the present disclosure. In various implementations, video coding system 100 may include a prediction module 202, a transform module 204, a quantization module 206, a scanning module 208, and an entropy encoding module 210. In various implementations, video coding system 200 may be configured to encode video data (e.g., in the form of video frames or pictures) according to various video coding standards and/or specifications, including, but not limited to, the High Efficiency Video Coding (HEVC) video compression standard planned to be finalized by the end 2012. In the interest of clarity, the various devices, systems and processes are described herein in the context of the HEVC standard although the present disclosure is not limited to any particular video coding standards and/or specifications. In addition, in accordance with the present disclosure, entropy encoding module 210 may implement a Context-Based Adaptive Arithmetic Coding (CABAC) engine as will be described in greater detail below.

Prediction module 202 may perform spatial and/or temporal prediction using the input video data 101. For example, input video image frames may be decomposed into slices that are further sub-divided into macroblocks for the purposes of encoding. Prediction module 202 may apply known spatial (intra) prediction techniques and/or known temporal (inter) prediction techniques to predict macroblock data values.

Transform module 204 may then apply known transform techniques to the macroblocks to spatially decorrelate the macroblock data. Those of skill in the art may recognize that transform module 204 may first sub-divide 16×16 macroblocks into 4×4 or 8×8 blocks before applying appropriately sized transform matrices.

Quantization module 206 may then quantize the transform coefficients in response to a quantization control parameter that may be changed, for example, on a per-macroblock basis. For example, for 8-bit sample depth the quantization control parameter may have 52 possible values. In addition, the quantization step size may not be linearly related to the quantization control parameter.

Scanning module 208 may then scan the matrices of quantized transform coefficients using various known scan order schemes to generate a string of transform coefficient symbol elements. The transform coefficient symbol elements as well as additional syntax elements such as macroblock type, intra prediction modes, motion vectors, reference picture indexes, residual transform coefficients, and so forth may then be provided to entropy coding module 210, which may in turn output coded video data 212.

In typical implementations, for each coding unit (CU) with residual, a transform unit (TU) quadtree pattern is signaled by transmitting transform split flags. One node in the quadtree may be split to four smaller sizes if the corresponding split flag is equal to one. In typical HEVC designs, the entropy CABAC coding of the transform split flag may utilize four contexts, and the context index may be derived using the following equation:

$$\text{context\_index} = \text{block\_depth} + \text{transform\_depth} \tag{1}$$

Where the block_depth indicates the depth value of the current CU quadtree patter, and transform_depth indicates the relative depth value of the current TU quadtree pattern inside the current CU. The possible value of the context index of the transform split flag ranges from zero to three in such an example.

For example, according to working draft (WD7) and HEVC Test Model 7 (HM7.0), the context table for CABAC coding of split_transform_flag is designed based on the transform size. As shown in the pseudo code below, the first entry of context table is for 64×64 size, the second entry is for 32×32 size, the third entry is for 16×16 size, and etc. The split_transform_flag value of sizes equal to 64×64 and smaller than 8×8 can be inferred implicitly, and therefore the corresponding CABAC initValues are all equal to CNU.

The following pseudo code illustrates an CABAC initValue table of split_transform_flag in HM7.0:

```
static const UChar
INIT_TRANS_SUBDIV_FLAG[3]
[NUM_TRANS_SUBDIV_FLAG_CTX] =
{
    { CNU, 153, 138, 138, CNU, CNU, CNU, CNU, CNU, CNU, },
    { CNU, 124, 138, 94, CNU, CNU, CNU, CNU, CNU, CNU, },
    { CNU, 224, 167, 122, CNU, CNU, CNU, CNU, CNU, CNU, },
}
```

Both the HM7.0 and WD7 directly use the depth value to calculate the context index as follows:

$$\text{ctxIdx} = \text{ctDepth} + \text{trafoDepth} \tag{1}$$

where the ctDepth indicates the depth of current CU relative to the LCU, and trafoDepth indicates the transform depth relative to current CU. However, it's observed by HM ticket #533 that current context index derivation scheme of split_transform_flag may result in unwanted context when the LCU size is not equal to 64×64. For example, when LCU size is equal to 32×32, ctDepth is equal to 0 and trafoDepth is equal to 0, the ctxIdx will be 0, whose initial context value is equal to CNU. Thus, the derivation of context index of split_transform_flag should be corrected in order to avoid the unwanted results, and to be fit in its initial intention.

Besides, mismatch for the CABAC initValue table of split_transform_flag between WD7 and HM7.0 is also observed.

As will be described in greater detail below, operations for size based transform unit context derivation may be applied to the problem of video compression, and may be considered as a potential technology to be standardized in the international video codec committees. In some examples, a new context index derivation scheme may be used to code the transform split flag. For example, a simpler context derivation scheme may be applied to entropy CABAC coding of transform split flags. Instead of using depth values of CU and TU, the context index of transform split flags may be derived by using the TU size. Such a TU size based context index derivation may decouple the affect between different CU size and TU size, which may be more straightforward and easy to be implemented. Equation (2) below shows one example of the TU size based context index derivation:

$$\text{context\_index} = 5 - \log 2(\text{TU\_size}) \tag{2}$$

Where the TU_size indicates the size of block of the current TU quadtree pattern inside the current CU. Additionally, equation (2) may be expressed so as to express the numeral five as a function of the maximum TU size with log 2(max_TU_size), to read as follows:

$$\text{context\_index} = \log 2(\text{max\_TU\_size}) - \log 2(\text{TU\_size}) \tag{2'}$$

where the max_TU_size indicates the size of block of max available TU.

In HEVC coding, the TU block sizes may be 32×32, 16×16, 8×8, and/or 4×4 transform cores. When the TU size is larger than 32×32, splitting is unavoidable, so the split flag may implicitly be inferred to be equal to one and need not be explicitly coded and transmitted. Similarly, when the TU size reaches 4×4, there is no further splitting, so the split flag can again be implicitly inferred to be equal to zero and need not be explicitly coded and transmitted. Therefore, only the he TU block sizes of 32×32, 16×16, and 8×8 will need explicit transform split flags. In such an example, three contexts can fulfill all of the possibilities. When the TU block size along the quadtree reaches 32×32, the context index may be equal to zero. When the TU block size along the quadtree reaches 16×16, the context index may be equal to one. When the TU block size along the quadtree reaches 8×8, the context index may be equal to two.

For example, in order to solve the problems described above, a simplified context index derivation scheme for coding the split_transform_flag is proposed. The proposed method is based on the transform size, instead of using the depth value.

1. To solve the mismatch between WD7 and HM7.0, the CABAC initValue of split_transform_flag in WD is changed to be consistent to HM7.0.

2. Since the split_transform_flag is explicitly signaled only when the transform tree reaches size of 32×32, 16×16 and 8×8, only three contexts are needed. Therefore, the number of contexts used to coding split_transform_flag can be reduced to three. The modified initValue table of is shown as follows:

TABLE 1

WD changes for solution 2: initValue table of split_transform_flag

| Initialization variable | split_transform_flag ctxIdx | | | | | | | | |
|---|---|---|---|---|---|---|---|---|---|
| | 0 | 1 | 2 | 3 | 4 | 5 | 6 | 7 | 8 |
| initValue | 224 | 167 | 122 | 124 | 138 | 94 | 153 | 138 | 138 |

3. Corresponding derivation process for ctxIdx of split_transform_flag is also modified as follows:

TABLE 2

Assignment of ctxIdxInc to binIdx for all ctxIdxTable and ctxIdxOffset values

| Syntax element | ctxIdxTable, ctxIdxOffset | | binIdx | | | |
| --- | --- | --- | --- | --- | --- | --- |
| | | 0 | 1 | 2 | 3 | >=4 |
| split_transform_flag | Table 9-24 | 0 | 5-log2-TrafoSize | na | na | na | na |
| | | 3 | 5-log2-TrafoSize | na | na | na | na |
| | | 6 | 5-log2-TrafoSize | na | na | na | na |

The proposed method does not change the resulting ctxIdx of split_transform_flag, so it does not affect the coding results when LCU size equal to 64×64. Table 3 shows the BD-rate results for the comparison between HM 7.0 with the proposed technique and HM 7.0 for common test conditions and the LCU size is configured as 32×32. The BD-rate results for LCU equal to 16×16 are shown in Table 4. Under all the configuration of AI_main, LB_main and RA_main, the coding gain and coding time of the proposed method are without any change, compared to the HM7.0.

TABLE 3

Testing results of solution 2, when LCU size is equal to 32 × 32

| | Y | U | V |
| --- | --- | --- | --- |
| All Intra Main | | | |
| Class A | 0.0% | 0.0% | 0.0% |
| Class B | 0.0% | 0.0% | 0.0% |
| Class C | 0.0% | 0.0% | 0.0% |
| Class D | 0.0% | 0.0% | 0.0% |
| Class E | 0.0% | 0.1% | 0.0% |
| Overall | 0.0% | 0.0% | 0.0% |
| | 0.0% | 0.0% | 0.0% |
| Class F | 0.0% | 0.0% | -0.1% |
| Enc Time [%] | | 100% | |
| Dec Time [%] | | #NUM! | |
| Random Access Main | | | |
| Class A | 0.0% | 0.4% | -0.2% |
| Class B | 0.0% | -0.1% | -0.2% |
| Class C | 0.0% | 0.0% | -0.1% |
| Class D | 0.0% | -0.2% | -0.1% |
| Class E | | | |
| Overall | 0.0% | 0.0% | -0.2% |
| | 0.0% | 0.0% | -0.2% |
| Class F | 0.1% | 0.1% | 0.2% |
| Enc Time [%] | | 100% | |
| Dec Time [%] | | #NUM! | |
| Low delay B Main | | | |
| Class A | | | |
| Class B | 0.0% | 0.1% | 0.2% |
| Class C | 0.0% | 0.3% | -0.2% |
| Class D | 0.0% | 1.1% | 0.4% |
| Class E | 0.0% | -0.4% | 0.2% |
| Overall | 0.0% | 0.3% | 0.2% |
| | 0.0% | 0.2% | 0.1% |
| Class F | -0.1% | 0.6% | -1.0% |
| Enc Time [%] | | 99% | |
| Dec Time [%] | | #NUM! | |

TABLE 4

Testing results of solution 2, when LCU size is equal to 16 × 16

| | Y | U | V |
| --- | --- | --- | --- |
| All Intra Main | | | |
| Class A | 0.0% | 0.0% | 0.0% |
| Class B | 0.0% | 0.0% | 0.0% |
| Class C | 0.0% | 0.0% | 0.0% |
| Class D | 0.0% | 0.0% | 0.0% |
| Class E | 0.0% | -0.1% | 0.0% |
| Overall | 0.0% | 0.0% | 0.0% |
| | 0.0% | 0.0% | 0.0% |
| Class F | 0.0% | -0.2% | -0.1% |
| Enc Time [%] | | 100% | |
| Dec Time[%] | | #NUM! | |
| Random Access Main | | | |
| Class A | 0.0% | 1.7% | -0.3% |
| Class B | 0.0% | 0.1% | 0.3% |
| Class C | 0.0% | 0.0% | 0.0% |
| Class D | 0.0% | -0.1% | 0.2% |
| Class E | | | |
| Overall | 0.0% | 0.4% | 0.1% |
| | 0.0% | 0.4% | 0.1% |
| Class F | 0.0% | 0.0% | 0.0% |
| Enc Time [%] | | 99% | |
| Dec Time[%] | | #NUM! | |
| Low delay B Main | | | |
| Class A | | | |
| Class B | 0.0% | -0.1% | -0.6% |
| Class C | 0.0% | 0.0% | 0.0% |
| Class D | 0.0% | 0.2% | 0.3% |
| Class E | 0.0% | 0.2% | -0.6% |
| Overall | 0.0% | 0.1% | -0.2% |
| | 0.0% | 0.0% | -0.2% |
| Class F | 0.0% | -0.6% | 1.0% |
| Enc Time [%] | | 100% | |
| Dec Time [%] | | #NUM! | |

As will be discussed in greater detail below, video coding system 100, as described in FIGS. 1 and/or 2 may be used to perform some or all of the various functions discussed below in connection with FIGS. 3 and/or 4.

Figure 3:
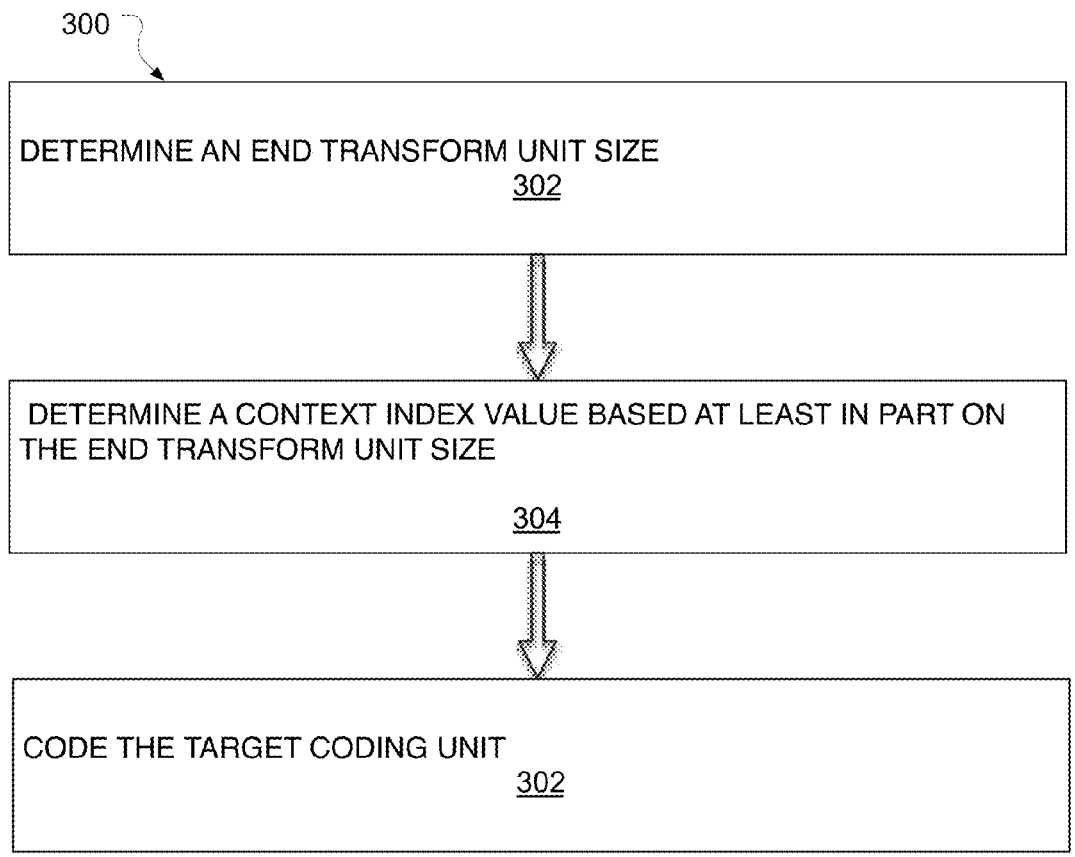
FIG. 3 is a flow chart illustrating an example video coding process.

FIG. 3 is a flow chart illustrating an example video coding process 300, arranged in accordance with at least some implementations of the present disclosure. In the illustrated implementation, process 300 may include one or more operations, functions or actions as illustrated by one or more of blocks 302, 304, and/or 306. By way of non-limiting example, process 300 will be described herein with reference to example video coding system 100 of FIGS. 1 and/or 6.

Process 300 may be utilized as a computer-implemented method for content aware selective adjusting of motion estimation. Process 300 may begin at block 302, "DETERMINE AN END TRANSFORM UNIT SIZE," where the end transform unit size may be determined. For example, the end transform unit size for individual leaf nodes of a transform unit quadtree pattern portion of a quadtree pattern associated with a target coding unit may be determined.

Although process 300, as illustrated, is directed to decoding, the concepts and/or operations described may be applied in the same or similar manner to coding in general, including in encoding.

Processing may continue from operation 302 to operation 304, "DETERMINE A CONTEXT INDEX VALUE BASED AT LEAST IN PART ON THE END TRANSFORM UNIT SIZE", where the context index value may be determined based at least in part on the end transform unit size. For example, the context index value may be associated with the individual leaf nodes of the transform unit quadtree pattern portion and may be determined based at least in part on the end transform unit size.

In some examples, the determination of the context index value may be performed as part of a context adaptive entropy coding operation. Additionally, in some examples, the determination of the context index value may be performed as part of a context adaptive entropy coding operation to code one or more transform split flags.

Processing may continue from operation 304 to operation 306, "CODE THE TARGET CODING UNIT", where the target unit may be coded. For example, the target unit may be coded based at least in part on the determined context index value.

Some additional and/or alternative details related to process 300 may be illustrated in one or more examples of implementations discussed in greater detail below with regard to FIG. 4.

Figure 4:
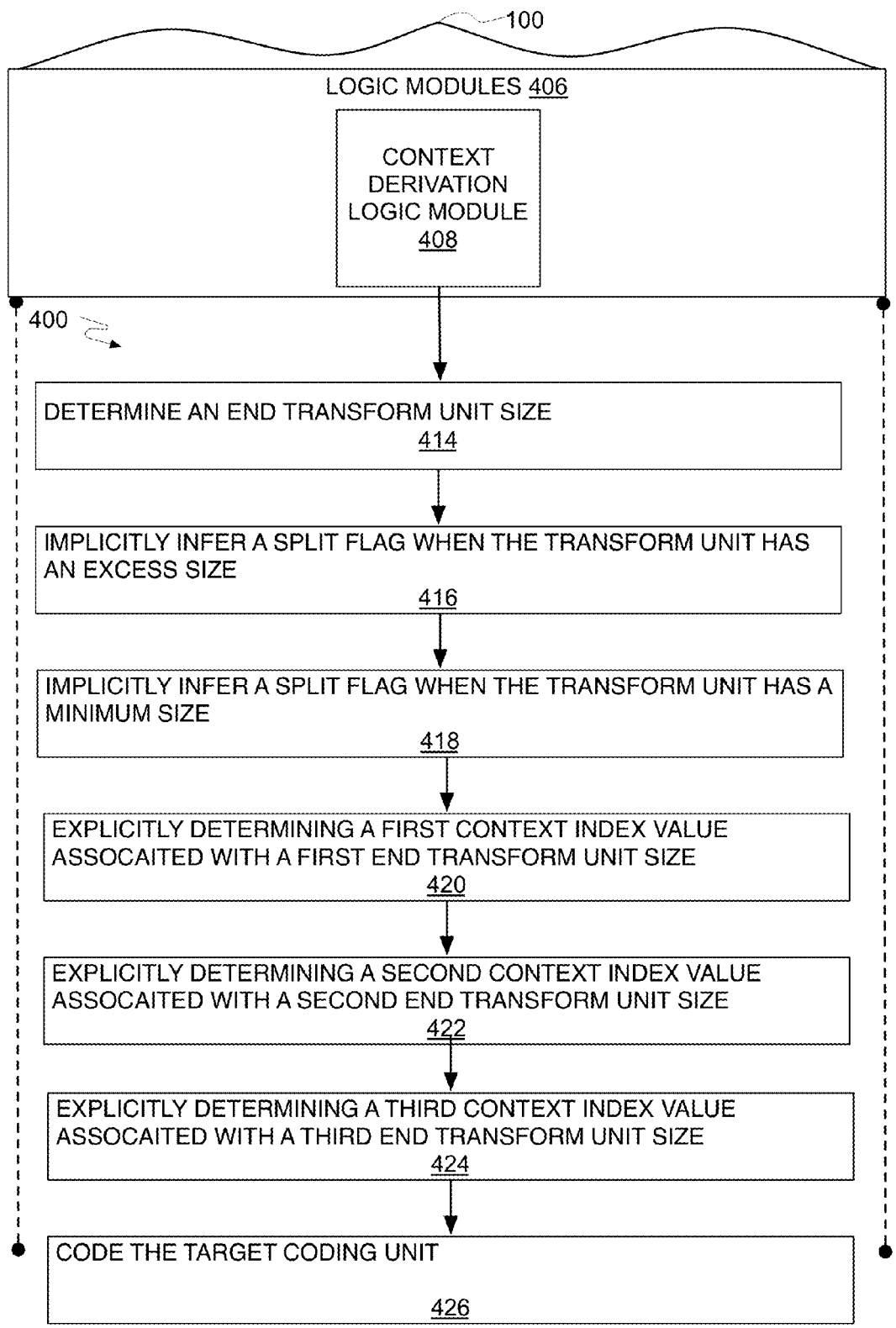
FIG. 4 is an illustrative diagram of an example video coding process in operation.

FIG. 4 is an illustrative diagram of example video coding system 100 and video coding process 400 in operation, arranged in accordance with at least some implementations of the present disclosure. In the illustrated implementation, process 400 may include one or more operations, functions or actions as illustrated by one or more of actions 414, 416, 418, 420, 422, 424, and/or 426. By way of non-limiting example, process 400 will be described herein with reference to example video coding system 100 of FIGS. 1 and/or 6.

In the illustrated implementation, video coding system 100 may include logic modules 406, the like, and/or combinations thereof. For example, logic modules 406, may include context derivation logic module 408, the like, and/or combinations thereof. Although video coding system 100, as shown in FIG. 4, may include one particular set of blocks or actions associated with particular modules, these blocks or actions may be associated with different modules than the particular module illustrated here.

Process 400 may begin at block 414, "DETERMINE AN END TRANSFORM UNIT SIZE," where the end transform unit size may be determined. For example, the end transform unit size for individual leaf nodes of a transform unit quadtree pattern portion of a quadtree pattern associated with a target coding unit may be determined.

Although process 400, as illustrated, is directed to decoding, the concepts and/or operations described may be applied in the same or similar manner to coding in general, including in encoding.

Processing may continue from operation 414 to operation 416, "IMPLICITLY INFER A SPLIT FLAG WHEN THE TRANSFORM UNIT HAS AN EXCESS SIZE", where a split flag may be implicitly inferred when the transform unit has an excess size. For example, split flag of one may be implicitly inferred when the transform unit has a size in excess of 32×32. In such an example, the inferred split flag of one may not be explicitly coded. For example, both the encoder and decoder may implicitly recognize the need to perform a split operation where the transform unit has a size in excess of 32×32, for example.

Processing may continue from operation 416 to operation 418, "IMPLICITLY INFER A SPLIT FLAG WHEN THE TRANSFORM UNIT HAS A MINIMUM SIZE", where a split flag may be implicitly inferred when the end transform unit has a minimum size. For example, a split flag of zero may be implicitly inferred when the end transform unit has a size of 4×4. In such an example, the inferred split flag of zero may not be explicitly coded. For example, both the encoder and decoder may implicitly recognize that there is no need to perform a split operation where the transform unit has a minimum size of 4×4, for example.

Processing may continue from operation 418 to operation 420, "EXPLICITLY DETERMINING A FIRST CONTEXT INDEX VALUE ASSOCIATED WITH A FIRST END TRANSFORM UNIT SIZE", where a first context index value may be explicitly determined based at least in part on a first end transform unit size. For example, the first context index value of zero may be explicitly determined when the end transform unit has a size of 32×32.

For example, the context index value may be associated with the individual leaf nodes of the transform unit quadtree pattern portion and may be determined based at least in part on the end transform unit size.

In some examples, the determination of the context index value may be performed as part of a context adaptive entropy coding operation. Additionally, in some examples, the determination of the context index value may be performed as part of a context adaptive entropy coding operation to code one or more transform split flags.

Processing may continue from operation 420 to operation 422, "EXPLICITLY DETERMINING A SECOND CONTEXT INDEX VALUE ASSOCIATED WITH A SECOND END TRANSFORM UNIT SIZE", where a second context index value may be explicitly determined based at least in part on a second end transform unit size. For example, second context index value of 1 may be explicitly determined when the end transform unit has a size of 16×16.

Processing may continue from operation 422 to operation 424, "EXPLICITLY DETERMINING A THIRD CONTEXT INDEX VALUE ASSOCIATED WITH A THIRD END TRANSFORM UNIT SIZE", where a third context index value may be explicitly determined based at least in part on a third end transform unit size. For example, the third context index value of 2 may be explicitly determined when the end transform unit has a size of 8×8.

Processing may continue from operation 424 to operation 426, "CODE THE TARGET CODING UNIT", where the target unit may be coded. For example, the target unit may be coded based at least in part on the determined context index value.

In operation, processes 300 and 400, as illustrated in FIGS. 3 and 4, may operate so that size based transform unit context derivation may be applied to the problem of video compression, and may be considered as a potential technology to be standardized in the international video codec committees. In some examples, a new context index derivation scheme may be used to code the transform split flag, which may be based on the transform unit size value, rather than the depth value.

Further, the determination of the context index value maybe limited to only three potential contexts. Accordingly, the number of possible contexts may be reduced from four contexts to three contexts, thereby reducing the complexity of entropy coding of transform split flags.

While implementation of example processes 300 and 400, as illustrated in FIGS. 3 and 4, may include the undertaking of all blocks shown in the order illustrated, the present disclosure is not limited in this regard and, in various examples, implementation of processes 300 and 400 may include the undertaking only a subset of the blocks shown and/or in a different order than illustrated.

In addition, any one or more of the blocks of FIGS. 3 and 4 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 3 and 4 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 5:
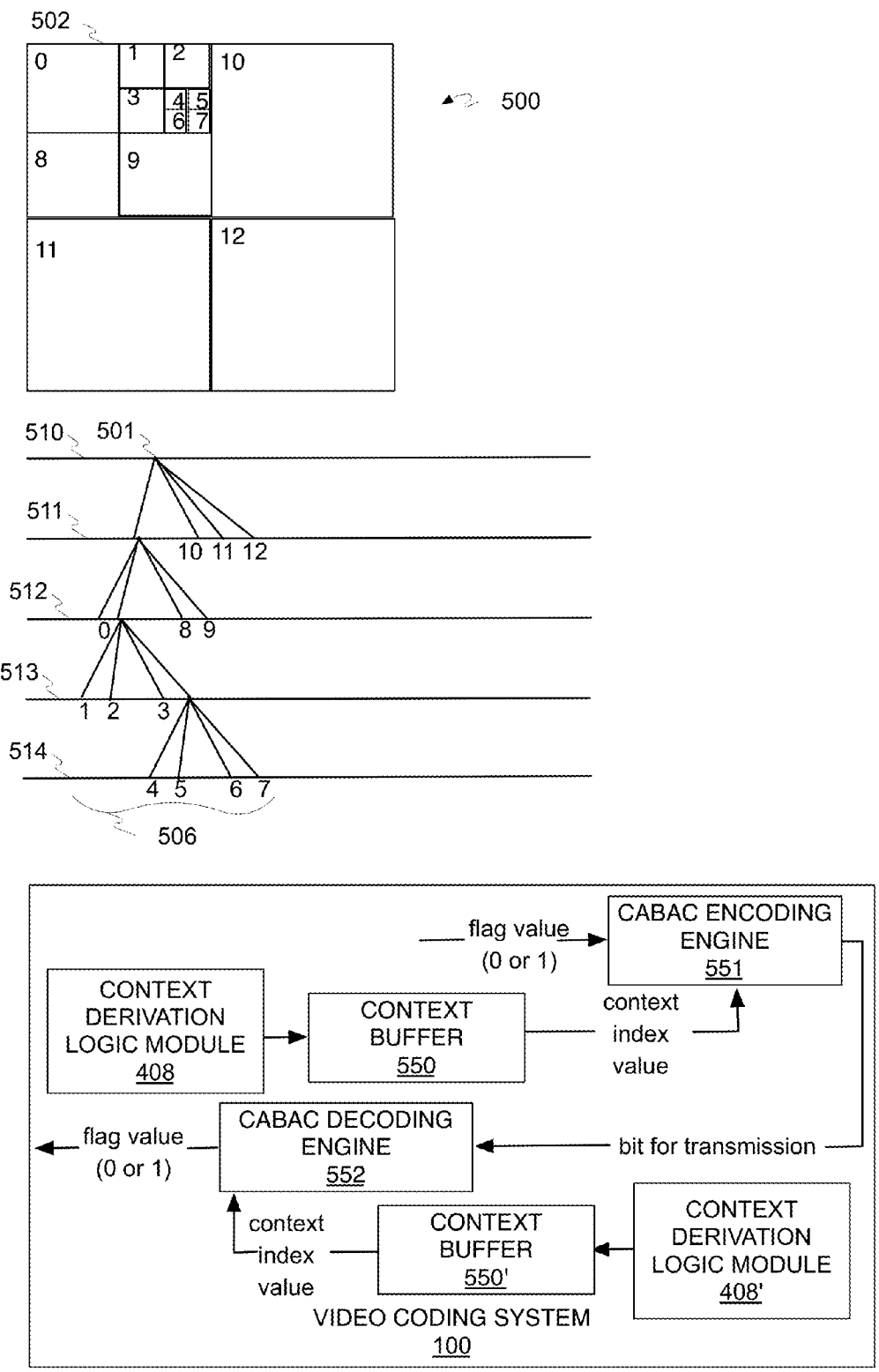
FIG. 5 is an illustrative diagram of example quadtree pattern.

FIG. 5 is an illustrative diagram of example quadtree pattern. In the illustrated implementation 500, a quadtree pattern 501 associated with a portion of a coding unit 502. As illustrated, quadtree pattern 501 may have a plurality of leaf nodes 506 distributed among various depth levels. For example, a zero depth level 510, a primary depth level 511, a secondary depth level 512, a tertiary depth level 513, and/or a quaternary level 514.

As illustrated coding unit 502 might include a 64×64 block, while transform unit blocks 0-12 might include transform block sizes of 32×32, 16×16, 8×8, and/or 4×4. In the illustrated example, transform unit blocks 10, 11, and 12 are shown as having block sizes of 32×32; transform unit blocks 0, 8, and 9 are shown as having block sizes of 16×16; transform unit blocks 4, 5, 6, and 7 are shown as having block sizes of 8×8; and transform unit blocks 1, 2, and 3 are shown as having block sizes of 4×4, although this is only one example.

The end transform unit size (e.g., 32×32, 16×16, 8×8, and/or 4×4) for individual leaf nodes 506 of quadtree pattern 501 associated with a target coding unit 502 may be determined, as has been described above. The context index values may be associated with the individual leaf nodes 506 quadtree pattern 501 and may be determined based at least in part on the end transform unit size (e.g., 32×32, 16×16, 8×8, and/or 4×4).

As discussed above, the determination of the context index value may be performed as part of a context adaptive entropy coding operation to code one or more transform split flags. For each coding unit (CU), the bitstream syntax may be structured as follows: after the syntax of CU mode and CU prediction information been transmitted, the transform quadtree may be signaled, as illustrated, for example, in the pseudo code below:

```
coding_unit( ) {
    coding_unit_mode_info( );
    coding_unit_prediction_info( );
    transform_tree( 0, 0 );
}
```

Inside the transform tree, the syntax of the transform split flags may be signaled firstly. If transform split flags is equal to 1, the transform quadtree will go into next depth level. If transform split flags is equal to 0, it will not be split and residual information will be transmitted, as illustrated, for example, by the pseudo code below:

```
transform_tree( TU_depth, quadtree_idx ) {
    split_transform_flag; // coding this flag using CABAC
    if ( split_transform_flag ) {
        transform_tree( TU_depth + 1, 0 );
        transform_tree( TU_depth + 1, 1 );
        transform_tree( TU_depth + 1, 2 );
        transform_tree( TU_depth + 1, 3 );
    }
    else {
        residual_info( );
    }
}
```

As illustrated, video coding system 100 may, in some examples, be implemented for context adaptive entropy coding (CABAC) operations. During the data flow of CABAC coding of the transform split flags, context derivation logic module 408 and context buffer 550 may be identical (or nearly identical) at the encoder side and decoder side (e.g., context derivation logic module 408' and context buffer 550') of video coding system 100, to make sure the transform split flag value can be restored correctly when decoding. For example, on the encoder side, context index determination module 304 may output a context index value that may be stored in context buffer 550. The determination of the context index value may be performed as part of a context adaptive entropy coding (CABAC) operation to code one or more transform split flags. Accordingly, CABAC encoding engine 552 may receive a context index value from context buffer 550 to code a corresponding transform split flag value (e.g., of 0 or 1) based at least in part on the context index value.

As described in detail above, the determination of the context index value maybe limited to only three potential contexts. Accordingly, the number of possible contexts may be reduced from four contexts to three contexts, thereby reducing the complexity of entropy coding of transform split flags, and context buffer 550 may similarly have a reduced entry number of 3 instead of 4.

Figure 6:
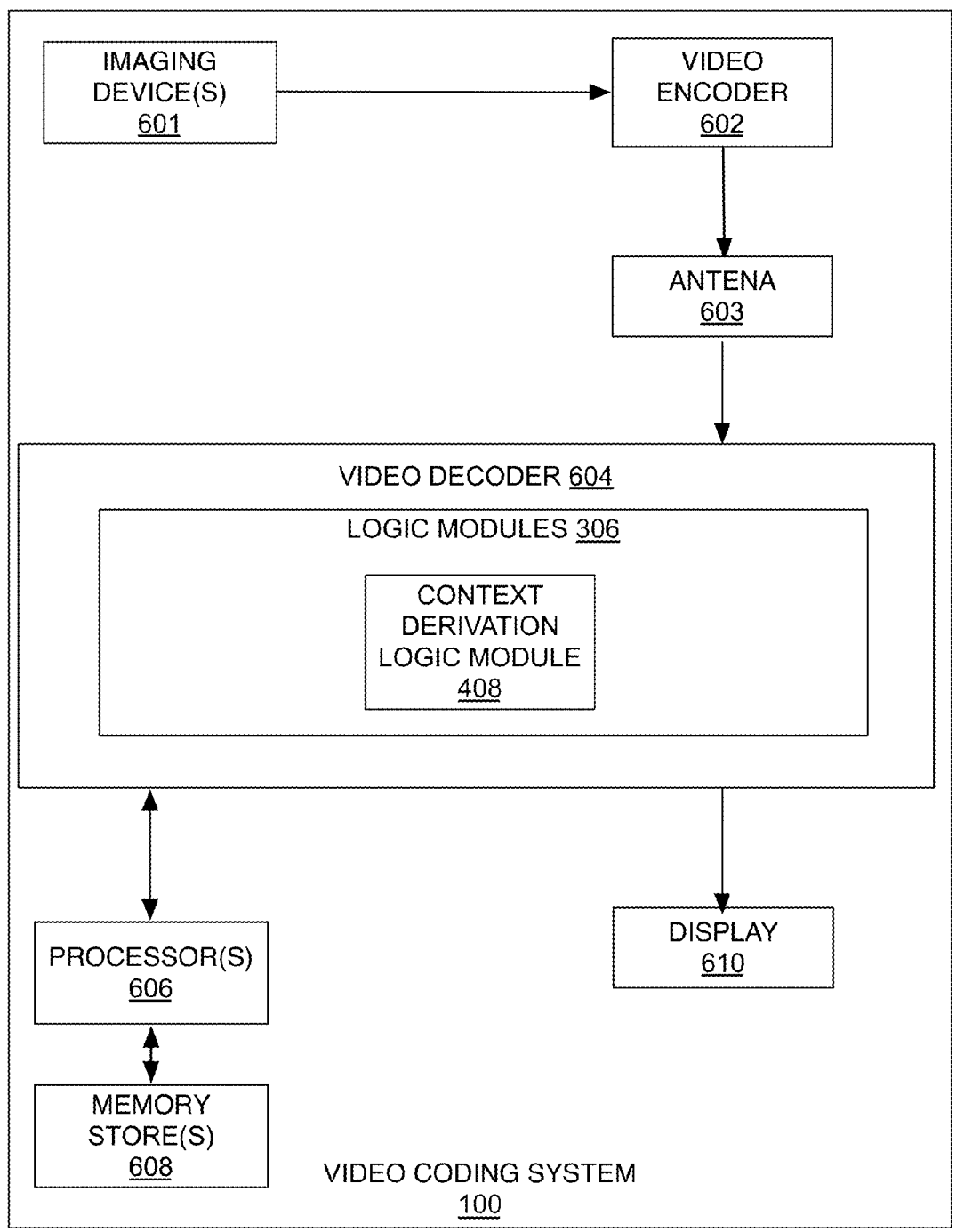
FIG. 6 is an illustrative diagram of an example video coding system.

FIG. 6 is an illustrative diagram of an example video coding system 100, arranged in accordance with at least some implementations of the present disclosure. In the illustrated implementation, video coding system 100 may include imaging device(s) 601, a video encoder 602, an antenna 603, a video decoder 604, one or more processors 606, one or more memory stores 608, a display 610, and/or logic modules 406. Logic modules 406 may include context derivation logic module 408, the like, and/or combinations thereof.

As illustrated, antenna 603, video decoder 604, processor 606, memory store 608, and/or display 610 may be capable of communication with one another and/or communication with portions of logic modules 406. Similarly, imaging device(s) 601 and video encoder 602 may be capable of communication with one another and/or communication with portions of logic modules 406. Accordingly, video decoder 604 may include all or portions of logic modules 406, while video encoder 602 may include similar logic modules. Although video coding system 100, as shown in FIG. 6, may include one particular set of blocks or actions associated with particular modules, these blocks or actions may be associated with different modules than the particular module illustrated here.

In some examples, video coding system 100 may include antenna 603, video decoder 604, the like, and/or combinations thereof. Antenna 603 may be configured to receive an encoded bitstream of video data. Video decoder 604 may be communicatively coupled to antenna 603 and may be configured to decode the encoded bitstream.

In other examples, video coding system 100 may include display device 610, one or more processors 606, one or more memory stores 608, context derivation logic module 408, the like, and/or combinations thereof. Display 610 may be configured to present video data. Processors 606 may be communicatively coupled to display 610. Memory stores 608 may be communicatively coupled to the one or more processors 606. Context derivation logic module 408 of video decoder 604 (or video encoder 602 in other examples) may be communicatively coupled to the one or more processors 606 and may be configured to perform size based transform unit context derivation.

In various embodiments, context derivation logic module 408 may be implemented in hardware, while software may implement other logic modules. For example, in some embodiments, context derivation logic module 408 may be implemented by application-specific integrated circuit (ASIC) logic other logic modules may be provided by software instructions executed by logic such as processors 606. However, the present disclosure is not limited in this regard and context derivation logic module 408 may be implemented by any combination of hardware, firmware and/or software. In addition, memory stores 608 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 608 may be implemented by cache memory.

Figure 7:
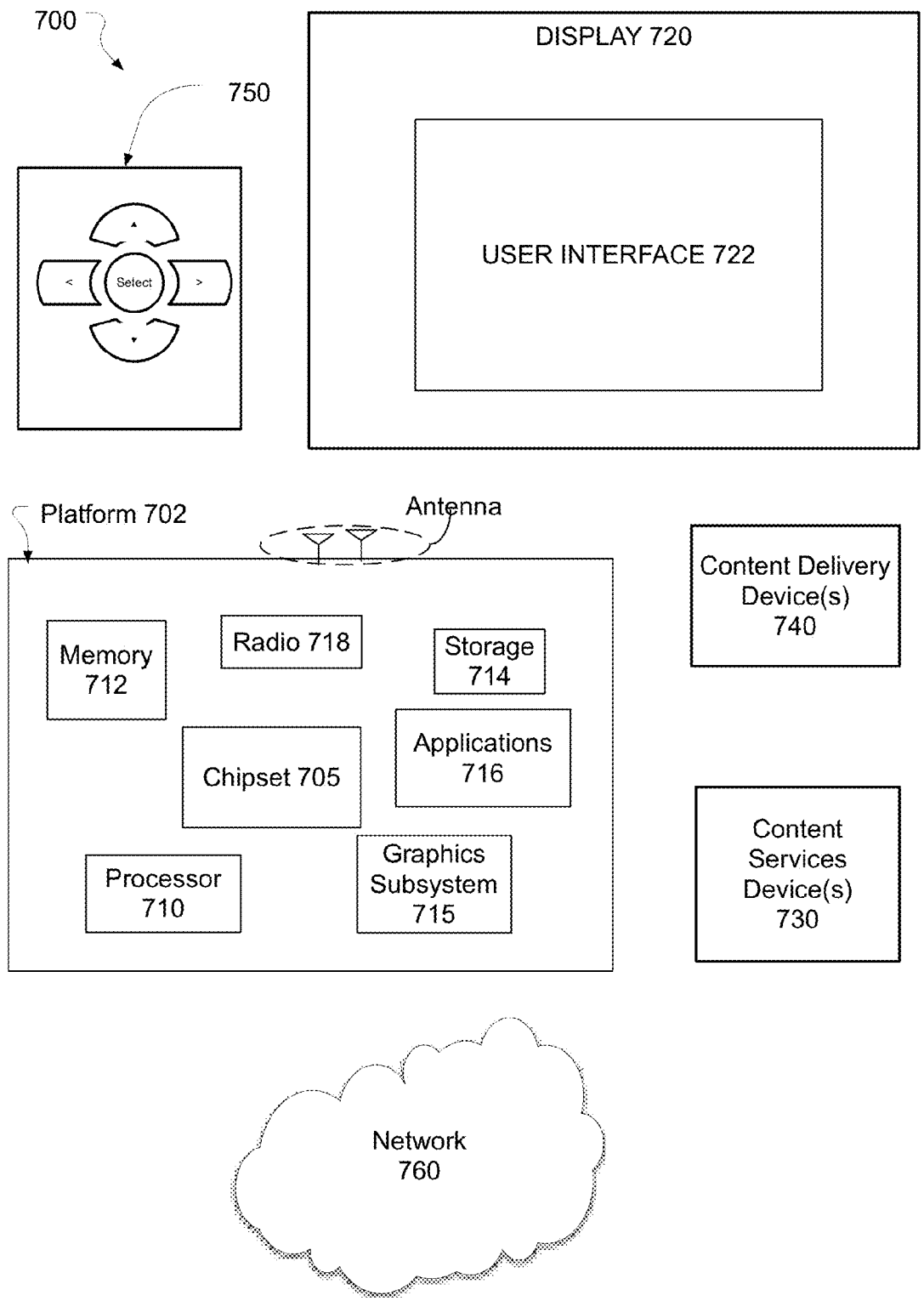
FIG. 7 is an illustrative diagram of an example system.

FIG. 7 illustrates an example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, Display Port, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive)

media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for (8.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
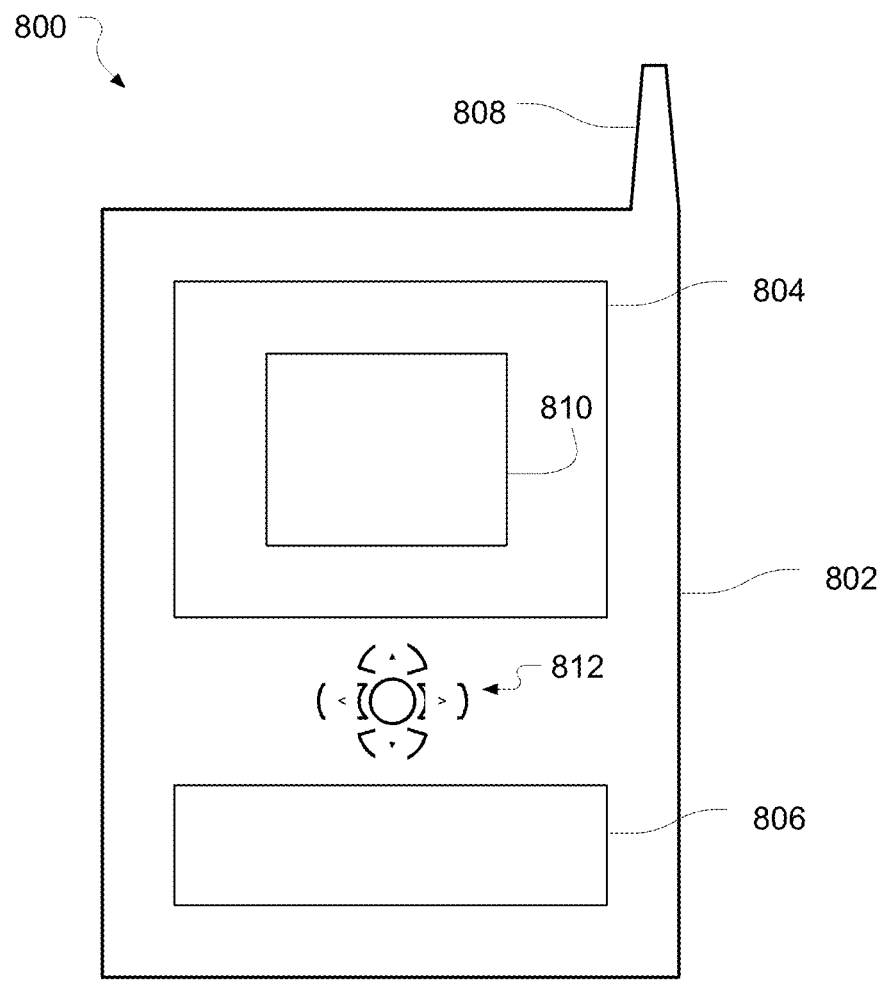
FIG. 8 is an illustrative diagram of an example system, all arranged in accordance with at least some implementations of the present disclosure.

As described above, system 700 may be embodied in varying physical styles or form factors. FIG. 8 illustrates implementations of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. An apparatus, comprising:
   circuitry to:
   determine a transform unit (TU) size for a node of a TU quadtree, the TU associated with a coding unit (CU) and the TU associated with a video frame,
   determine a context index value associated with an individual node of the TU quadtree based at least in part on the TU size, wherein to determine a context index value, the circuitry is to determine a value of $5-\log_2(TU\ size)$; and
   determine a transform split flag based at least in part on the determined context index value.

2. The apparatus of claim 1, wherein the determination of the context index value is performed as part of a context adaptive entropy coding operation to determine one or more transform split flags.

3. The apparatus of claim 1, wherein the determination of the context index value is performed as part of an entropy Context-adaptive binary arithmetic coding (CABAC) coding of transform split flags to determine one or more transform split flags.

4. The apparatus of claim 1, wherein the context index value comprises one of three potential values.

5. The apparatus of claim 1, wherein the circuitry is to:
   determine a split flag of 1 when the transform unit has a size in excess of 32×32, and wherein the split flag of 1 is not explicitly provided in a bitstream; and
   determine a split flag of 0 when the transform unit has a size of 4×4, and wherein the split flag of 0 is not explicitly provided in a bitstream.

6. The apparatus of claim 1, wherein the circuitry is to:
   determine a split flag of 1 when the transform unit has a size in excess of a first size, and wherein the split flag of 1 is not explicitly provided in a bitstream; and
   determine a split flag of 0 when the transform unit has a second size, and wherein the split flag of 0 is not explicitly provided in a bitstream.

7. The apparatus of claim 1, wherein the circuitry is to:
   determine a context index value of 0 when the transform unit has a size of 32×32;
   determine a context index value of 1 when the transform unit has a size of 16×16; and
   determine a context index value of 2 when the transform unit has a size of 8×8.

8. The apparatus of claim 1, wherein the circuitry is to:
   determine a split flag of 1 when the transform unit has a size in excess of 32×32, and wherein the split flag of 1 is not explicitly provided in a bitstream;
   determine a split flag of 0 when the transform unit has a size of 4×4, and wherein the split flag of 0 is not explicitly provided in a bitstream;
   determine a context index value of 0 when the transform unit has a size of 32×32;
   determine a context index value of 1 when the transform unit has a size of 16×16; and
   determine a context index value of 2 when the transform unit has a size of 8×8.

9. The apparatus of claim 1, wherein circuitry comprises hardware, firmware, software executed by a processor, or any combination thereof.

10. The apparatus of claim 1, further comprising a video encoder and wherein the circuitry is part of the video encoder.

11. The apparatus of claim 1, further comprising a video decoder and wherein the circuitry is part of the video decoder.

12. The apparatus of claim 1, wherein:
the CU comprises a partition of a picture and
the TU comprises a whole or part of the CU.

13. The apparatus of claim 12, wherein:
the TU comprises a square shaped region.

14. A system comprising:
a display;
an antenna configured to receive an encoded bitstream of video data;
a memory to store the bitstream;
a processor communicatively coupled to the display, antenna, and memory; and
decoder circuitry to:
determine a transform unit (TU) size for a node of a TU quadtree, the TU associated with a coding unit (CU) and the TU associated with a video frame,
determine a context index value associated with an individual node of the TU quadtree based at least in part on the TU size, wherein to determine a context index value, the circuitry is to determine a value of 5−log 2(TU size); and
determine a transform split flag based at least in part on the determined context index value.

15. The system of claim 14, wherein the determination of the context index value is performed as part of a context adaptive entropy coding operation to determine one or more transform split flags.

16. The system of claim 14, wherein the determination of the context index value is performed as part of an entropy Context-adaptive binary arithmetic coding (CABAC) of transform split flags to determine one or more transform split flags.

17. The system of claim 14, wherein the context index value comprises one of three potential values.

18. The system of claim 14, wherein the circuitry is to:
determine a split flag of a value of 1 when the transform unit has a size in excess of a first size, and wherein the split flag of 1 is not explicitly provided in the bitstream and
determine a split flag value of 0 when the transform unit has a second size, and wherein the split flag value of 0 is not explicitly provided in the bitstream.

19. The system of claim 14, wherein the circuitry is to:
determine a context index value of 0 when the transform unit has a size of 32×32;
determine a context index value of 1 when the transform unit has a size of 16×16; and
determine a context index value of 2 when the transform unit has a size of 8×8.

20. The system of claim 14, wherein the circuitry is to:
determine a split flag of 1 when the transform unit has a size in excess of 32×32, and wherein the split flag of 1 is not explicitly provided in the bitstream;
determine a split flag of 0 when the transform unit has a size of 4×4, and wherein the split flag of 0 is not explicitly provided in the bitstream;
determine a context index value of 0 when the transform unit has a size of 32×32;
determine a context index value of 1 when the transform unit has a size of 16×16; and
determine a context index value of 2 when the transform unit has a size of 8×8,
wherein the determination of the context index value is performed as part of a context adaptive entropy coding operation to determine one or more transform split flags, and
wherein the context index value comprises one of three potential values.

21. The apparatus of claim 14, wherein:
the CU comprises a partition of a picture and
the TU comprises a whole or part of the CU.

22. At least one non-transitory article comprising a computer program stored thereon having instructions that, if executed by the computer, cause the computer to: determine a transform unit (TU) size for a node of a TU quadtree, the TU associated with a coding unit (CU) and the TU associated with a video frame; determine a context index value associated with an individual node of the TU quadtree based at least in part on the TU size, wherein to determine a context index value, the computer is to determine a value of 5−log 2(TU size); and determine a transform split flag based at least in part on the determined context index value.

23. The non-transitory article of claim 22, wherein the determination of the context index value is performed as part of a context adaptive entropy coding operation to determine one or more transform split flags.

24. The non-transitory article of claim 22, wherein the determination of the context index value is performed as part of an entropy Context-adaptive binary arithmetic coding (CABAC) coding of transform split flags to determine one or more transform split flags.

25. The non-transitory article of claim 22, wherein the context index value comprises one of three potential values.

26. The non-transitory article of claim 22, further comprising instructions stored thereon, that, if executed by the computer, cause the computer to: determine a split flag of a value of 1 when the transform unit has a size in excess of a first size, and wherein the split flag of 1 is not explicitly provided in a bitstream; and determine a split flag value of 0 when the transform unit has a second size, and wherein the split flag value of 0 is not explicitly provided in a bitstream.

27. The non-transitory article of claim 22, further comprising instructions stored thereon, that, if executed by the computer, cause the computer to: determine a context index value of 0 when the transform unit has a size of 32.times.32; determine a context index value of 1 when the transform unit has a size of 16.times.16; and determine a context index value of 2 when the transform unit has a size of 8.times.8.

28. The non-transitory article of claim 22, further comprising instructions stored thereon, that, if executed by the computer, cause the computer to: determine a split flag of 1 when the transform unit has a size in excess of 32.times.32, and wherein the split flag of 1 is not explicitly provided in a bitstream; determine a split flag of 0 when the transform unit has a size of 4.times.4, and wherein the split flag of 0 is not explicitly provided in a bitstream; determine a context index value of 0 when the transform unit has a size of 32.times.32; determine a context index value of 1 when the transform unit has a size of 16.times.16; and determine a context index value of 2 when the transform unit has a size of 8.times.8, wherein the determination of the context index value is performed as part of a context adaptive entropy coding operation to determine one or more transform split flags, and wherein the context index value comprises one of three potential values.

29. The non-transitory article of claim 22, wherein: the CU comprises a partition of a picture and the TU comprises a whole or part of the CU.

30. A computer-implemented method, the method comprising:
 determining a transform unit (TU) size for a node of a TU quadtree, the TU associated with a coding unit (CU) and the TU associated with a video frame,
 determining a context index value associated with an individual node of the TU quadtree based at least in part on the TU size, wherein determining a context index value comprises determining a value of 5−log 2(TU size); and
 determining a transform split flag based at least in part on the determined context index value.

31. The method of claim 30, wherein the context index value comprises one of three potential values.

32. The method of claim 30, wherein determining the context index value is part of a context adaptive entropy coding operation to determine one or more transform split flags.

33. The method of claim 30, wherein determining the context index value is part of an entropy Context-adaptive binary arithmetic coding (CABAC) coding of transform split flags to determine one or more transform split flags.

34. The method of claim 30, further comprising:
 determining a split flag of a value of 1 when the transform unit has a size in excess of a first size, and wherein the split flag of 1 is not explicitly provided in a bitstream; and
 determining a split flag value of 0 when the transform unit has a second size, and wherein the split flag value of 0 is not explicitly provided in a bitstream.

35. The method of claim 30, further comprising:
 determining a context index value of 0 when the transform unit has a size of 32×32;
 determining a context index value of 1 when the transform unit has a size of 16×16; and
 determining a context index value of 2 when the transform unit has a size of 8×8.

36. The method of claim 30, wherein:
the CU comprises a partition of a picture and
the TU comprises a whole or part of the CU.

37. An apparatus, comprising:
circuitry to:
 determine a region size for a node of a region quadtree, the region associated with a second region and the region associated with a video frame,
 determine a context index value associated with an individual node of the region quadtree based at least in part on the region size, wherein to determine a context index value, the circuitry is to determine a value of 5−log 2(region size); and
 determine a split flag based at least in part on the determined context index value.

38. The apparatus of claim 37, wherein
the region comprises a transform unit (TU),
the second region comprises a coding unit (CU),
the CU comprises a partition of a picture, and
the TU comprises a whole or part of the CU.

39. The apparatus of claim 37, wherein the determination of the context index value is performed as part of a context adaptive entropy coding operation to determine one or more transform split flags.

40. The apparatus of claim 37, wherein the determination of the context index value is performed as part of an entropy Context-adaptive binary arithmetic coding (CABAC) coding of transform split flags to determine one or more transform split flags.

41. The apparatus of claim 37, wherein the context index value comprises one of three potential values.

* * * * *